United States Patent
Shepley et al.

(10) Patent No.: US 9,694,807 B2
(45) Date of Patent: Jul. 4, 2017

(54) METHOD AND APPARATUS FOR CONTROLLING A POWERTRAIN SYSTEM EMPLOYING MULTIPLE TORQUE GENERATING DEVICES

(71) Applicant: GM GLOBAL TECHNOLOGY OPERATIONS LLC, Detroit, MI (US)

(72) Inventors: Luke David Shepley, Novi, MI (US); Anthony H. Heap, Ann Arbor, MI (US); Eric Piper, Fenton, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/694,537

(22) Filed: Apr. 23, 2015

(65) Prior Publication Data

US 2016/0311424 A1 Oct. 27, 2016

(51) Int. Cl.
*B60W 20/13* (2016.01)
*B60W 10/06* (2006.01)
*B60W 10/08* (2006.01)

(52) U.S. Cl.
CPC ............ *B60W 20/13* (2016.01); *B60W 10/06* (2013.01); *B60W 10/08* (2013.01); *B60W 2510/244* (2013.01); *B60W 2540/00* (2013.01); *B60W 2710/0677* (2013.01); *B60W 2710/086* (2013.01); *Y10S 903/93* (2013.01)

(58) Field of Classification Search
CPC ...... B60W 20/13; B60W 10/06; B60W 10/08; B60W 2710/086; B60W 2510/244; B60W 2710/0677; B60W 2540/00; Y10S 903/93
See application file for complete search history.

(56) References Cited

U.S. PATENT DOCUMENTS

2013/0184915 A1* 7/2013 Boskovitch ........... B60W 20/00 701/22

* cited by examiner

*Primary Examiner* — Mussa A Shaawat
*Assistant Examiner* — Michael Kerrigan
(74) *Attorney, Agent, or Firm* — Quinn IP Law

(57) ABSTRACT

A powertrain system for a vehicle is described, and includes an internal combustion engine mechanically coupled to an electric machine to generate propulsion torque and electric power storable on an energy storage device. A method for controlling the powertrain system includes determining a first desired powertrain output power associated with a road load and determining a second desired powertrain output power associated with a feed-forward state-of-charge (SOC) for the energy storage device. The internal combustion engine and the electric machine are controlled responsive to the first and second desired powertrain output powers.

10 Claims, 3 Drawing Sheets

METHOD AND APPARATUS FOR CONTROLLING A POWERTRAIN SYSTEM EMPLOYING MULTIPLE TORQUE GENERATING DEVICES

TECHNICAL FIELD

This disclosure relates to powertrain systems employing multiple torque-generating devices and dynamic system controls associated therewith.

BACKGROUND

Hybrid powertrain systems generate propulsion torque from two or more energy sources, e.g., hydrocarbon-based fuels through an internal combustion engine, and electric power through one or more electric machines, with the propulsion torque transferred through a torque transmission device to an output member coupled to a driveline. Such powertrain systems may employ either or both a charge-depleting operating strategy or a charge-sustaining operating strategy, wherein such strategies refer to managing a state of charge (SOC) of an energy storage system for the electric machines. In a charge-depleting operating strategy, a powertrain control system controls powertrain operation such that the SOC of the energy storage system achieves a minimum state during a vehicle trip, or key-on cycle, and manages torque from the internal combustion engine and torque from the electric machine(s) based upon such. In a charge-sustaining operating strategy, a powertrain control system controls powertrain operation such that the SOC of the energy storage system is at the same level at end of a vehicle trip as it was at a beginning of the vehicle trip, and manages torque from the internal combustion engine and torque from the electric machine(s) based thereon.

Control systems for operating hybrid powertrain systems control torque outputs of the engine and electric machine(s) and apply torque transfer elements in the transmission to transfer torque in response to operator-commanded output torque requests, taking into account fuel economy, emissions, drivability, and other factors. A control system monitors various inputs from the vehicle and the operator and provides operational control of the hybrid powertrain, including controlling transmission operating mode and gear shifting, controlling torque outputs from the engine and electric machine(s), and regulating the electrical power interchange among the electrical energy storage device and the electric machines to manage outputs of the transmission, including torque and rotational speed.

SUMMARY

A powertrain system for a vehicle is described, and includes an internal combustion engine mechanically coupled to an electric machine to generate propulsion torque and electric power storable on an energy storage device. A method for controlling the powertrain system includes determining a first desired powertrain output power associated with a road load and determining a second desired powertrain output power associated with a feed-forward state-of-charge (SOC) for the energy storage device. The internal combustion engine and the electric machine are controlled responsive to the first and second desired powertrain output powers.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
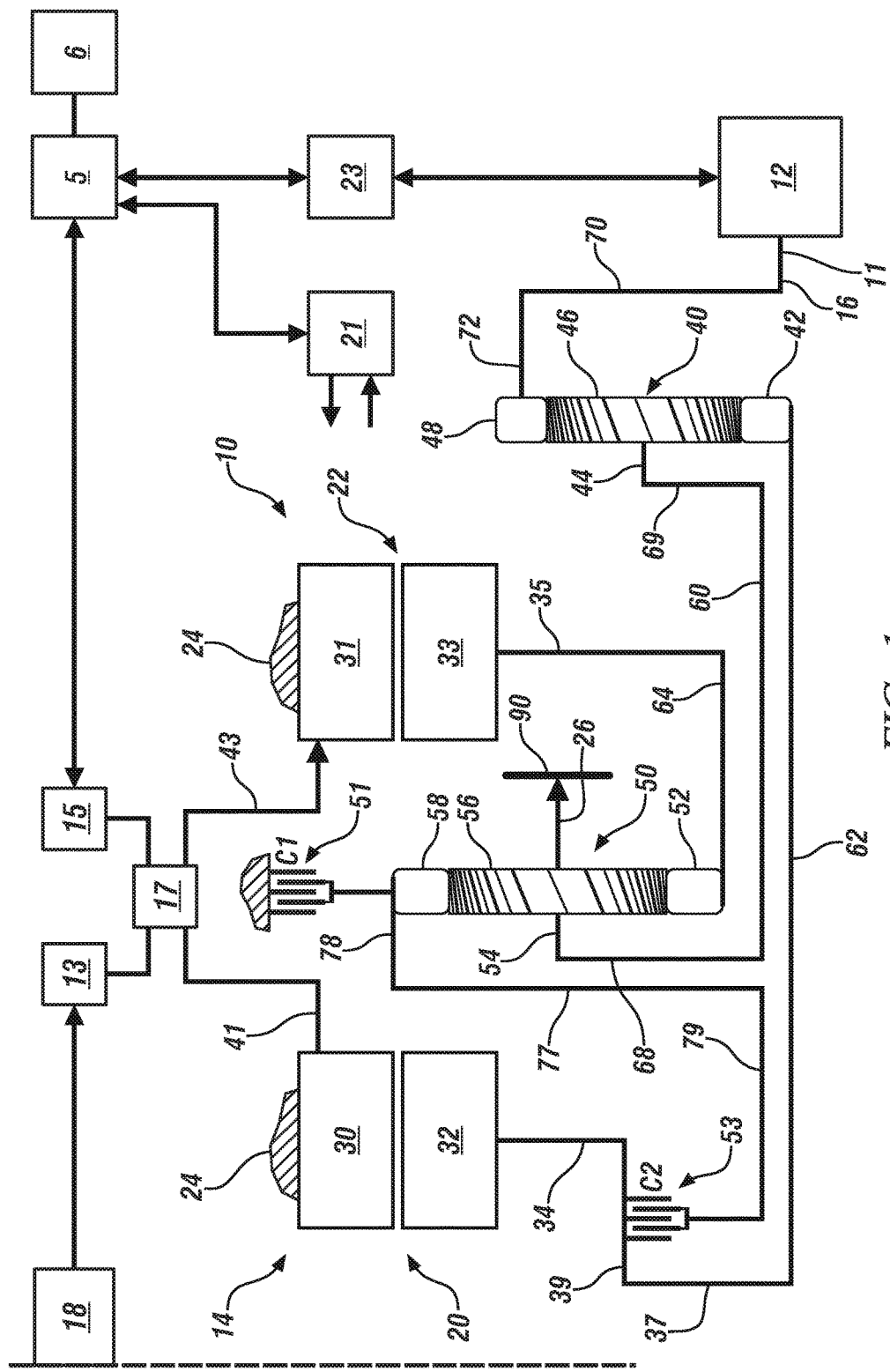
FIG. 1 schematically illustrates a powertrain system that includes an internal combustion engine and multi-mode transmission that couples to a driveline, the operation of which is controlled by a hybrid control module, in accordance with the disclosure.

Referring now to the drawings, wherein the showings are for the purpose of illustrating certain exemplary embodiments only and not for the purpose of limiting the same, FIG. 1 schematically illustrates elements of a hybrid powertrain system 10 for a vehicle including an internal combustion engine (engine) 12 and first and second electric machines 20, 22, respectively, that mechanically couple to a multi-mode transmission (transmission) 14 to transfer torque therebetween. The transmission 14 mechanically couples to a driveline 90 to transfer propulsion torque. Power generated by the engine 12 originates from stored energy in the form of hydrocarbon fuel, and may provide vehicle propulsion torque and/or provide input power to one or both of the first and second electric machines 20, 22 operating in an electric power generating (charging) mode. Power generated by the first and second electric machines 20, 22 originates from electrical energy stored in a high-voltage electrical energy storage device (battery) 13, or from the engine 12. In one embodiment, the battery 13 may couple via a charger 18 to an off-vehicle electric power supply to effect charging of the battery 13 during periods when the vehicle is parked. Such a system may be referred to as a plug-in hybrid vehicle. One or both the first and second electric machines 20, 22 may be employed to generate vehicle propulsion torque. The operations of the various elements of the powertrain system 10 are dynamically controlled by a hybrid control module (HCP) 5. The powertrain system 10 is illustrative of one embodiment on which the concepts described herein may be employed. It is appreciated that the concepts described herein may be employed on any embodiment of a hybrid powertrain system that includes an internal combustion engine that mechanically couples to at least one electric machine to generate propulsion torque and electric power for storage on a battery.

The internal combustion engine (engine) 12 includes a rotating crankshaft 11 that rotatably couples to an input member 16 of the transmission 14. The rotating crankshaft 11 couples to the input member 16 of the transmission 14 such that rotation of the crankshaft 11 causes a corresponding rotation of the input member 16. The crankshaft 11 may couple to the input member 16 through an intervening clutch, torque converter device or other device that is capable of decoupling rotation of the engine crankshaft 11 from the corresponding rotation of the input member 16 of the transmission 14.

The transmission 14 includes first and second planetary gear sets 40, 50, respectively, having elements that rotatably couple to the first and second electric machines 20, 22, respectively. Planetary gear set 40 includes sun gear 42, carrier member 44 and ring gear 48. The carrier member 44 rotatably supports a plurality of pinion gears 46 that mesh with the sun gear 42, and the ring gear 48 meshes with the pinion gears 46. Planetary gear set 50 includes sun gear 52, carrier member 54 that rotatably supports a plurality of pinion gears 56 that mesh with the sun gear 52, and a ring gear 58 meshes with the pinion gears 56. Rotor hub 35 rotates in concert with the sun gear 52 through an intermediate sleeve shaft 64. In one embodiment and as described herein, the transmission 14 is an electro-mechanical transmission device wherein the first and second electric machines 20, 22 are electrically powered motor/generators. It is appreciated that the concepts described herein are not limited to transmissions employing only first and second simple planetary gear sets, but may also advantageously apply to transmissions employing any plurality of simple or complex planetary gear sets or other gear train configurations.

The first electric machine 20 and the second electric machine 22 are packaged within a case housing/ground 24 and rotatably couple between the input member 16 and a transmission output member 26 that reacts with the driveline 90. The first electric machine 20 includes an annular stator 30 grounded to the transmission casing 24 and an annular rotor 32 supported on a rotatable rotor hub 34. The second electric machine 22 includes an annular stator 31 grounded to the transmission casing 24 and an annular rotor 33 supported on a rotatable rotor hub 35.

The battery 13 supplies electric power to a power inverter 17 that electrically connects with the first stator 30 via transfer conductors 41 to control operation thereof. The battery 13 may be any high-voltage electrical energy storage device, including those employing lithium-ion cells or other suitable electrochemical devices. Power output of the battery 13 may be characterized in terms of voltage, current and state of charge (SOC). The SOC provides an indication of stored electrical energy on the battery 13, e.g., in units of A-h or other suitable units, and may be determined by any suitable method such as current integration. The battery 13 is preferably characterized in terms of a minimum SOC and a maximum SOC. Operations that cause the battery 13 to exceed the maximum SOC or fall below the minimum SOC may cause physical and chemical changes in the battery 13 that may reduce its service life, and are thus undesirable.

The power inverter 17 also electrically connects with the second stator 31 via transfer conductors 43 to control operation of the second electric machine 22 to control operation. The first and second electric machines 20, 22 may operate as motors or generators. Either of the first and second electric machines 20, 22 may operate as an electric motor in which stored electrical power provided by the battery 13 is converted by the power inverter 17 and provided to the respective stator 30, 31 to generate torque. Either of the first and second electric machines 20, 22 may operate as an electric generator in which vehicle momentum may be converted to electrical power stored in the battery 13 or used by the second electric machine 22.

The transmission 14 further includes a first clutch C1 51 and a second clutch C2 53. The first clutch C1 51 is a grounding clutch or brake that is selectively activated to ground the ring gear member 58 to the transmission casing 24. The input member 16 is axially spaced from and not concentric with shaft 60, which couples the carrier member 44 of the first planetary gear set 40 and the carrier member 54 of the second planetary gear set 50. Shaft 72 is preferably coaxial with the input member 16, which couples to hub member 70 to couple with the input member 16 for common rotation with the ring gear 48. Shaft 62 couples rotor hub 34 with sun gear 42 via hub member 37 and an axially-extending portion 39. The second clutch C2 53 nests between an axially extending portion 39, hub 37 and shaft 62. A hub member 77 couples with the second clutch C2 53. A separate sleeve shaft 60 concentric with shaft 62 couples carrier member 54 and hub members 68 and 69 to carrier member 44, and thus fixedly couples rotation of the carrier member 44 to rotation of the carrier member 54. Sleeve shaft 64 couples rotor hub 35 with sun gear 52. Axially-extending member 78, hub 77 and axially-extending member 79, which is an annular shaft, couples the second clutch C2 53 with the first clutch C1 51 and ring gear 58. Axially-extending member 78 circumscribes the planetary gear set 50. The ring gear member 58 decouples from the sun gear member 42 when the second clutch C2 53 is deactivated.

The transmission 14 selectively operates in fixed-gear modes and variable modes, with the variable modes being electrically-variable modes in one embodiment. Transmission operation in a fixed-gear mode includes any operation wherein the rotational speed of the output member 26 is a direct ratio of the rotational speed of the input member 16. The transmission 14 operates in one fixed-gear mode at a first gear ratio by activating both the first and second clutches C1 51 and C2 53. The transmission 14 operates in an engine-off fixed-gear mode at a second gear ratio by activating the first clutch C1 51 in combination with the engine 12 being in an OFF state under conditions as described herein. The first gear ratio and the second gear ratio may be determined based upon the gear ratios of the first and second planetary gear sets 40, 50. Transmission operation in one of the variable modes includes any operating condition wherein the rotational speed of the output member 26 is determined based upon the speed of the input member 16 in combination with rotational speeds of the first and second electric machines 20, 22, the gear ratios of the planetary gear sets 40, 50, activation states of the first and second clutches C1 51 and C2 53 and other factors.

The HCP 5 communicates with an engine control module (ECM) 23, an inverter controller 15, and a transmission control module (TCM) 21, along with other devices. The HCP 5 provides supervisory control over the ECM 23 and the inverter controller 15 and an operator interface device 6 that receives commands from a vehicle operator. The HCP 5 coordinates torque commands between the engine 12 and the first and second electric machines 20, 22 to control output torque in response to a driver's torque request (driver torque request) that is input to the operator interface device 6. The operator interface device 6 includes one or a plurality of devices through which the operator commands operation of the vehicle and powertrain system, including, e.g., an accelerator pedal, a brake pedal, an ignition key, a transmission range selector, a charge mode selector, a cruise control actuator, and other related devices. The operator interface device 6 generates commands for operating the vehicle, including, e.g., a vehicle key-on/key-off state, a transmission range selection, e.g., one of Park, Reverse, Neutral and Drive, the driver torque request, a selected charge mode, and other related commands. The powertrain system 10 generates an output torque that is delivered to the vehicle wheels through the driveline 90 in response to the driver torque request and other inputs to the operator interface device 6. The operator interface device 6 is shown as a unitary device for ease of illustration.

The power inverter module 17 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) or other suitable power switching devices for converting DC power from the battery 13 to AC power for powering respective ones of the first and second electric machines 20, 22 by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second electric machines 20, 22 for operation as motors or generators via transfer conductors. The inverter controller 15 controls the power inverter module 17 to transfer electrical power to and from the first and second electric machines 20, 22 in response to the motor torque commands. Electrical current is transferred across the high-voltage electrical bus to and from the battery 13 to charge and discharge the battery 13.

The ECM 23 operatively connects to the engine 12, and functions to acquire data from sensors and send actuator commands to the engine 12 over a plurality of discrete lines or other suitable communication links. The ECM 23 monitors engine speed and load, which are communicated to the HCP 5. The inverter controller 15 monitors and controls a first motor torque of the first electric machine 20 and a second motor torque of the second electric machine 22. Alternatively, two electronic controllers can be utilized, with each controller monitoring respective ones of the first and second electric machines 20, 22, respectively. The TCM 21 monitors rotational speeds and controls activation and deactivation of the first and second clutches C1 51 and C2 53.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers, and communications between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

During large transient changes such as may occur in response to accelerator pedal tip-in or tip-out maneuvers, the powertrain system may lag longer than necessary in matching the driver torque request. Such powertrain system lags may be caused by system latencies and incomplete coordination of torque actuators when limited by a system constraint, with such lag leading to a degradation in drive quality. Such transient changes may lead to lash transitions in mechanically meshed gears, which may cause driveline clunk if improperly managed.

Figure 2:
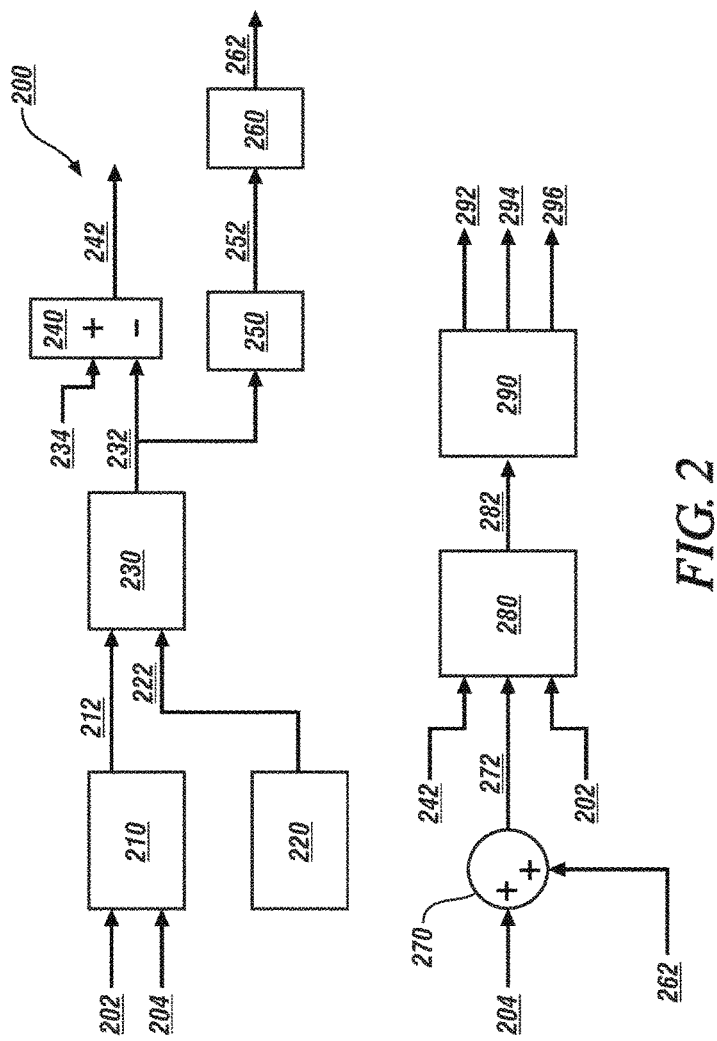
FIG. 2 schematically shows a signal flow diagram for an adaptive ramping feed-forward SOC control routine that may be periodically executed to control operation of an embodiment of the powertrain system of FIG. 1, in accordance with the disclosure.

FIG. 2 schematically shows a signal flow diagram for an adaptive ramping feed-forward SOC control routine 200 that may be periodically executed to control operation of an embodiment of the powertrain system 10 described hereinabove with reference to FIG. 1 as one or a plurality of routines that are executed in the HCP 5 and/or others of the controllers. The adaptive ramping feed-forward SOC control routine 200 is preferably executed as a control routine for controlling operation of the powertrain system 10 in response to operator commands such as the driver torque request and the selected charge mode, with outputs that affect operation of the vehicle in which the powertrain system 10 is deployed. Overall, the operation of the feed-forward SOC control routine 200 includes determining a charge mode and a target SOC, and determining a SOC ramp rate based upon output power and vehicle speed. The target SOC is ramped to a final target SOC, and a feed-forward power target is determined based upon the actual SOC ramp rate. The feed-forward power target is employed to manipulate the engine power output in a manner that allows the engine power to more closely track the output power from the powertrain system 10. Such operation minimizes likelihood of occurrence of high-speed operation of the engine 12 when the driver torque request is low, and also minimizes occurrence of lash events due to abrupt changes in engine torque when the driver torque request changes suddenly.

Monitored parameters include a road load, in kW, 204, a transmission output speed No 202, and the operator-selected charge mode 220. The transmission output speed No 202 correlates to vehicle speed based upon a gear ratio of the driveline 90. The road load 204 is determined based upon the driver torque request that is input via the accelerator pedal and/or brake pedal to the operator interface device 6.

The transmission output speed No 202 and the road load 204 may be employed in a ramp rate determination step 210 to determine a desired SOC ramp rate 212 (% SOC/min). The desired SOC ramp rate 212 is determined directly by a calibrated rate at which charging is desired, and is limited by a charging capacity of the battery 13 and a maximum power output from the engine 12. By way of a non-limiting example, the desired SOC ramp rate 212 may be calibrated at a rate of 1% SOC/min when operating in the mountain mode. A mountain mode may be enabled fifteen minutes before the vehicle begins an incline to achieve a 15% increase in the SOC. Furthermore, the desired SOC ramp rate 212 is indirectly based on the vehicle battery pack and engine size because this determines if a decrease in ramping up of the SOC or a ramp down of the SOC is required or desired. The battery pack and engine size also determine the maximum ramp rate. For example, if the engine 12 is only capable of charging the battery 13 at a maximum rate of 5% SOC/min when all engine power is used to charge the battery 13, a ramp rate of 1%/min may be unachievable under the circumstances. Alternatively, ramping may be disabled.

The operator-selected charge mode 220 is input to the charge mode selector of the operator interface device 6. There is a target desired SOC 222 (%) associated with each selectable charge mode, which may include, by way of example, a normal mode, a sport mode, a mountain mode, and a hold mode, among others. In the normal mode, the target desired SOC 222 may be associated with sustaining the SOC at the SOC state at startup, or the target desired SOC 222 may be associated with the minimum SOC for the battery 13. In the sport mode, the target desired SOC 222 may be associated with either a charge sustaining state or a charge depletion state, and the target desired SOC 222 may be increased to support short, aggressive driving maneuvers without depleting the battery to the minimum SOC. In the mountain mode, the target desired SOC 222 may be associated with a mid-range SOC between the minimum SOC and maximum SOC to allow the first and/or second electric machines 20, 22 to provide propulsion torque during hill climbing maneuvers without completely depleting the charge of the battery 13 and also permit charge recovery through regenerative braking during hill descending maneuvers without overcharging the battery 13. In the hold mode, the target desired SOC 222 may be any level greater than the minimum SOC and allows the vehicle operator to select an SOC level at which the battery charge is sustained in anticipation of an upcoming need for EV operation, such as city driving or another driving maneuver. The SOC ramps at the desired SOC ramp rate 212 (% SOC/min) until the target desired SOC 222 has been achieved. By way of example, if the target before a mode change was 10% and after the mode change it is 20%, the target desired SOC 222 is increased by the desired SOC ramp rate 212 as determined in step 210 during each iteration. So after a single iteration, the target desired SOC 222 is 10.1 when the desired SOC ramp rate 212 is 1%, then 10.2 and so on until it reaches the actual target which caps the end target. It logically can be thought of as the ramp rate pushing the target up from the previous set point.

An averaging filter element 230 combines the desired SOC ramp rate 212 and the target desired SOC 222 over a period of time to determine a filtered target SOC 232, which is subtracted from the actual SOC 234 (240) to determine a delta target SOC 242. The filtered target SOC 232 is subjected to a time-rate derivative (250) to determine a filtered target SOC ramp rate 252, which is converted to actual feed-forward power 262 (N-m/s, or W) employing a suitable conversion equation 260. The time-rate derivative of the filtered target SOC 232 detects when the ramp rate stops increasing. The same function could also be achieved by using the desired SOC ramp rate 212 from step 210 directly in combination with a logic bit that indicates whether ramping has completed or not to set the ramp rate to zero at that point. The ramp rate is then converted to a required power based on the energy capacity of the pack per the equation previously provided.

The actual feed-forward power 262 and the road load 204 are combined (270) to determine an effective output power (kW) 272. The effective output power 272 is employed in combination with the transmission output speed No 202 and the delta target SOC 242 (280) to determine a powertrain operating point 282 that achieves the driver torque request while providing the actual feed-forward power 262 that is responsive to the filtered target SOC 232, which is based upon the operator-selected charge mode 220.

The effective output power 272 is employed in a powertrain control routine 290 to select a preferred engine power 292 for operating the engine 12 and preferred motor powers Pa 294 and Pb 296 for operating the first and second electric machines 20, 22, respectively, to achieve the effective output power 272 and simultaneously respond to the driver torque request.

Figure 3:
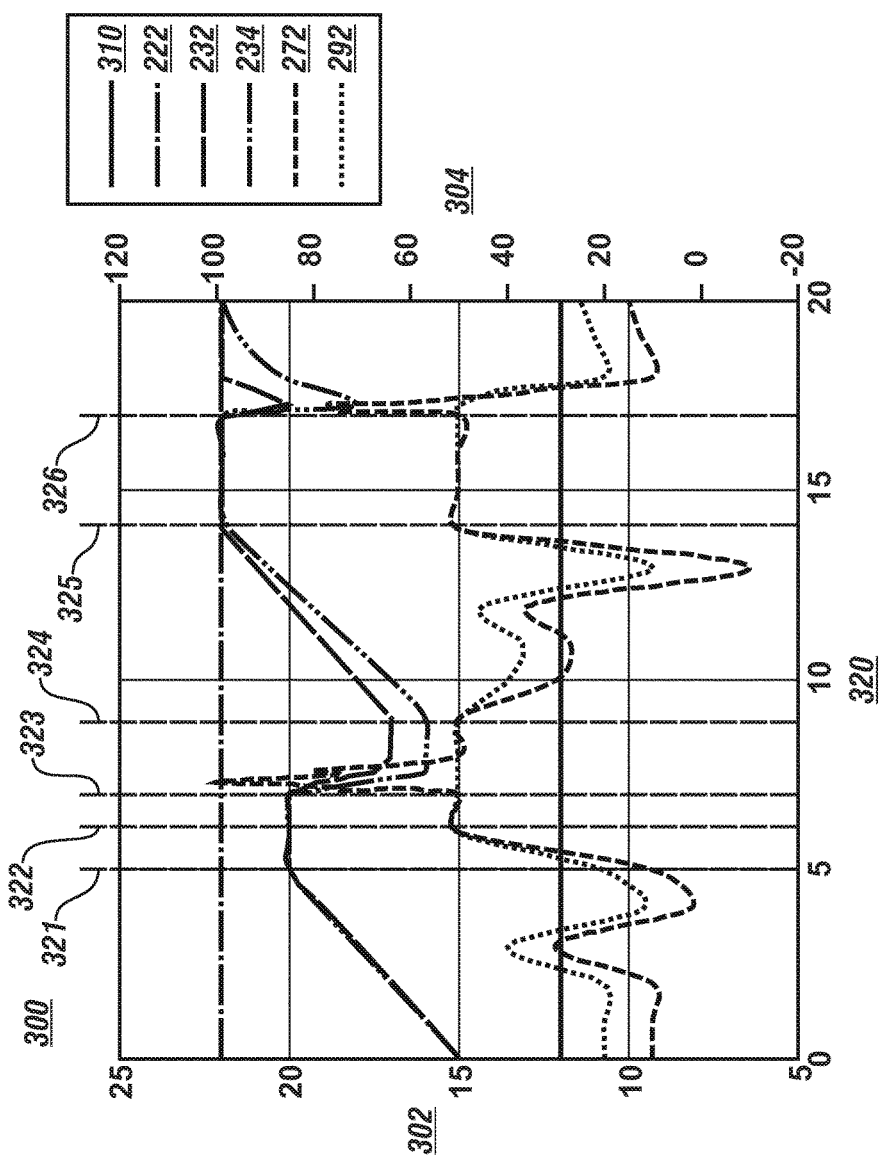
FIG. 3 graphically shows operation of an embodiment of the powertrain system described with reference to FIG. 1 employing an embodiment of the adaptive ramping feed-forward SOC control routine, in accordance with the disclosure.

FIG. 3 graphically shows a portion of operation 300 of an embodiment of the powertrain system 10 described with reference to FIG. 1 employing an embodiment of the adaptive ramping feed-forward SOC control routine 200 described with reference to FIG. 2. The graph includes SOC (%) 302 and power (kW) 304 on the vertical axes plotted in relation to time 320 on the horizontal axis, with timepoints 321 through 326 shown. Plotted data includes a charge-sustaining target SOC 310, a target desired SOC 222 for a selected charge mode, a filtered target SOC 232, an actual SOC 234, effective output power 272 and a preferred engine power 292. As shown, the target desired SOC 222 is associated with operation in the mountain mode. As previously described, the effective output power 272 includes the road load 204 and the actual feed-forward power 262.

During a transition between the charge-sustaining target SOC 310 and the target desired SOC 222, the preferred engine power 292 is greater than the effective output power 272, resulting in increases in the filtered target SOC 232 and the actual SOC 234, with both preferably increasing at a ramp rate that is dictated by the desired SOC ramp rate 212. Immediately prior to timepoint 321, an increase in the effective output power 272 causes an increase in the preferred engine power 292 and results in the filtered target SOC 232 and the actual SOC 234 reaching an intermediate SOC point that is less than the target desired SOC 222. At timepoint 322, a maximum state for the engine power 292 is achieved, and is sufficient to achieve the effective output power 272. The filtered target SOC 232 and the actual SOC 234 remain at the intermediate SOC point until timepoint 323, when there is an increase in the effective output power 272 that is unachievable by operation of the engine 12 due to the engine power 292 being at its maximum state. The powertrain system 10 responds to the increased effective output power 272 by increasing power outputs from the first and second electric machines 20, 22, with a corresponding decrease in the actual SOC 234. The filtered target SOC 232 also decreases, albeit at a rate that is less than the actual SOC 234 due to the effect of the target desired SOC 222. When the effective output power 272 reduces such that the engine power 292 is able to meet it, the actual SOC 234 and the filtered target SOC 232 stabilize, albeit at different SOC levels, prior to timepoint 324. At timepoint 324, the effective output power 272 decreases with a related decrease in the engine power 292. The engine power 292 remains greater than the effective output power 272, with the excess power used to increase the actual SOC 234 and the filtered target SOC 232. This operation continues until timepoint 325, at which point the actual SOC 234 and the filtered target SOC 232 converge on the target desired SOC 222 associated with the mountain mode and the engine power 292 converges with the effective output power 272. During the period between timepoints 325 and 326, the engine power 292 remains equal to the effective output power 272, and only changes at timepoint 326 in response to another increase in the effective output power 272, with a response that is analogous to that described with reference to timepoint 323.

The adaptive ramping feed-forward SOC control routine 200 provides feed-forward power to manipulate the SOC to increase engine power output, including an adaptive ramping of the SOC in relation to the output power and vehicle speed. Such operation may reduce likelihood of occurrences of undesired ride quality degradation caused by noise, vibration and harshness (NVH) related to engine use during controlled increases in the SOC such as may occur during extended high output power scenarios. This includes requesting additional output power during extended high output power operations. When the engine 12 is fully utilized, i.e., at or near its maximum output power, such operation is comprehended and feed-forward power requests may be reduced during high output power events. The feed-forward control includes a ramping logic to better manage NVH in vehicle applications that include engines having limited output. As such, during high output power events, the target SOC may be ramped back down. This can be done to directly match output power or by some limited amount such that a smaller target delta can be created to encourage more engine use earlier, but not excessive use. Because large target deltas in the SOC may create a mismatch of engine use and output power, comprehending events where the engine cannot provide all of the output power allows the SOC to be fully used. Operating parameters related to NVH limits may be violated only in scenarios where SOC has fallen to levels below normal charge sustaining targets. Such operation allows for manipulating the SOC in a predictable way, which may lead to less aggressive use of the engine under specific operating conditions, with attendant benefits of reduced fuel consumption and increased service life.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain system for a vehicle that includes an internal combustion engine mechanically coupled to an electric machine to generate propulsion torque and electric power storable on an energy storage device, the method comprising:
   determining a first desired powertrain output power associated with a road load;
   determining a second desired powertrain output power associated with a feed-forward state-of-charge (SOC) for the energy storage device; and
   controlling, by a controller, the internal combustion engine and the electric machine responsive to the first and second desired powertrain output powers; wherein determining the second desired powertrain output power associated with the feed-forward SOC for the energy storage device comprises:
      determining a desired SOC ramp rate based upon vehicle speed and the road load;
      determining a target desired SOC based upon an operator-selected charge mode;
      determining a filtered target SOC based upon the desired SOC ramp rate and the target desired SOC, wherein the filtered target SOC is determined by averaging the target desired SOC and the desired SOC ramp rate over a period of time;
      executing a time-rate derivative of the filtered target SOC; and
      determining the second desired powertrain output power associated with the feed-forward SOC for the energy storage device based upon the time-rate derivative of the filtered target SOC.

2. The method of claim 1, wherein determining the first desired powertrain output power associated with the road load comprises determining a powertrain output power associated with a driver torque request.

3. The method of claim 1, wherein determining the desired SOC ramp rate based upon vehicle speed and the road load comprises determining an SOC ramp rate limited based upon a charging capacity of the battery and a maximum power output from the engine.

4. The method of claim 1, wherein determining the target desired SOC based upon the selected charge mode comprises determining the target desired SOC based upon one of an operator-selected normal mode, sport mode, mountain mode, or hold mode.

5. The method of claim 1, wherein controlling the internal combustion engine and the electric machine responsive to the first and second desired powertrain output powers further comprises:
   determining a delta target SOC based upon a difference between the filtered target SOC and an actual SOC for the battery;
   determining an effective output power based upon the feed-forward SOC for the energy storage device; and
   determining a powertrain operating point based upon the delta target SOC, vehicle speed, and the effective output power.

6. A method for controlling a powertrain system that includes an internal combustion engine mechanically coupled to an electric machine to generate propulsion torque at a transmission output member and generate electric power storable on an energy storage device, the method comprising:
   determining a first desired powertrain output power associated with a driver torque request;
   determining a second desired powertrain output power associated with a feed-forward state-of-charge (SOC) for the energy storage device; and
   controlling, by a controller, the internal combustion engine and the electric machine responsive to the first and second desired powertrain output powers;
   wherein determining the second desired powertrain output power associated with the feed-forward SOC for the energy storage device includes:

determining a desired SOC ramp rate based upon a transmission output speed and the driver torque request, determining a target desired SOC based upon an operator-selected charge mode;

determining a filtered target SOC based upon the desired SOC ramp rate and the target desired SOC, wherein the filtered target SOC is determined by averaging the target desired SOC and the desired SOC ramp rate over a period of time, executing a time-rate derivative of the filtered target SOC, and determining the second desired powertrain output power associated with the feed-forward SOC for the energy storage device based upon the time-rate derivative of the filtered target SOC.

7. The method of claim 6, wherein determining the desired SOC ramp rate based upon vehicle speed and the driver torque request comprises determining an SOC ramp rate limited based upon a charging capacity of the battery and a maximum power output from the engine.

8. The method of claim 7, wherein determining the target desired SOC based upon the selected charge mode comprises determining the target desired SOC based upon one of an operator-selected normal mode, sport mode, mountain mode, or hold mode.

9. The method of claim 7, wherein controlling the internal combustion engine and the electric machine responsive to the first and second desired powertrain output powers further comprises:

determining a delta target SOC based upon a difference between the filtered target SOC and an actual SOC for the energy storage device;

determining an effective output power based upon the feed-forward SOC for the energy storage device; and determining a powertrain operating point based upon the delta target SOC, transmission output speed, and the effective output power.

10. A powertrain system, comprising:

an internal combustion engine mechanically coupled to a transmission and an electric machine, wherein the electric machine is electrically coupled to an electrical energy storage device; and a controller executing a control routine, the control routine operative to:

determine a first desired powertrain output power associated with a driver torque request;

determine a second desired powertrain output power associated with a feed-forward state-of-charge (SOC) for the energy storage device; and control the internal combustion engine and the electric machine responsive to the first and second desired powertrain output powers, including the control routine operative to:

determine a filtered target SOC based upon the desired SOC ramp rate and the target desired SOC, wherein the filtered target SOC is determined by averaging the target desired SOC and the desired SOC ramp rate over a period of time;

determine a delta target SOC based upon a difference between the filtered target SOC and an actual SOC for the electrical enemy storage device;

determine an effective output power based upon the feed-forward SOC for the energy storage device; and determine a powertrain operating point based upon the delta target SOC, a transmission output speed, and the effective output power.

* * * * *